(12) United States Patent
König et al.

(10) Patent No.: US 6,704,514 B1
(45) Date of Patent: Mar. 9, 2004

(54) METHOD OF ESTABLISHING AND/OR MAINTAINING A WAKE MODE FOR AN ELECTRICAL INSTALLATION

(75) Inventors: Jens König, Bochum (DE); Klaus Kunze, Bochum (DE); Sedat Karahan, Bochum (DE)

(73) Assignee: Nokia Mobile Phones Ltd., Espoo (FI)

( * ) Notice: Subject to any disclaimer, the term of this patent is extended or adjusted under 35 U.S.C. 154(b) by 525 days.

(21) Appl. No.: 09/592,355

(22) Filed: Jun. 12, 2000

(30) Foreign Application Priority Data

Jun. 12, 1999  (DE) ......................................... 199 26 846

(51) Int. Cl.$^7$ ............................................. H04B 10/00
(52) U.S. Cl. ...................... 398/107; 398/140; 398/141; 398/151; 398/171; 398/168; 455/90; 379/144; 379/59
(58) Field of Search ................................. 398/107, 140, 398/151, 141, 171, 168; 455/90; 379/144, 59

(56) References Cited

U.S. PATENT DOCUMENTS

| | | | | |
|---|---|---|---|---|
| 5,796,890 A | * | 8/1998 | Tsuji et al. | 385/24 |
| 6,091,527 A | * | 7/2000 | Brisse et al. | 359/143 |
| 6,282,415 B1 | * | 8/2001 | Buhler et al. | 455/343 |
| 6,501,577 B1 | * | 12/2002 | Graef | 359/152 |

FOREIGN PATENT DOCUMENTS

| | | |
|---|---|---|
| DE | 2716788 | 10/1978 |
| DE | 3142923 | 6/1983 |
| DE | 3142924 | 6/1983 |
| DE | 19708979 | 9/1998 |

\* cited by examiner

*Primary Examiner*—Leslie Pascal
*Assistant Examiner*—Hanh Phan
(74) *Attorney, Agent, or Firm*—Ware, Fressola, Van Der Sluys & Adolphson LLP

(57) ABSTRACT

The invention concerns a method of establishing and/or maintaining a wake mode in an electrical installation, which in addition to at least one receiving device has at least one transmitting device that is connected through an optical bus system. So as not to always have to operate the different devices in the stand-by mode when no data traffic takes place through the optical bus system, the state of the art proposes activating the receiving device only part of the time. If during that time the receiving device receives a corresponding signal from the transmitting device, the stand-by mode is ended in order to establish the data exchange. However this operating mode is also disadvantageous because of the power consumption. For that reason the invention proposes that in a first step the respective transmitting device provides optical signals to the optical bus system to establish and/or maintain the wake mode in the respective receiving device, that in a second step the optical signals arriving at the receiving device strike a converter equipped with a photosensitive layer, and that in a third step the optical signals striking this layer are used to establish the supply of energy for the receiving device. According to the invention it is also possible to supply the necessary power to the receiving device by using only the converted optical signals.

12 Claims, 8 Drawing Sheets

METHOD OF ESTABLISHING AND/OR MAINTAINING A WAKE MODE FOR AN ELECTRICAL INSTALLATION

TECHNICAL FIELD

The invention concerns a method of producing and/or maintaining a wake mode in a receiving module of an electronic installation as claimed in claim 1, which in addition to the receiving module also has a transmitting module that is connected through an optical bus system.

BACKGROUND OF THE INVENTION

Integrated information and communication devices in automobiles, or also navigation devices which are examples of electronic installations in conjunction with this application, for reasons of space are often divided into two or more modules since the user interfaces must be within reach of the driver but the entire information and communication device cannot be installed there. For that reason the largest part of the installation is often placed elsewhere, e.g. in the trunk or the rear of the vehicle. In that case the individual modules are interconnected by an optical bus system for reasons of weight and electromagnetic compatibility. However the power consumption of the module when the automobile's ignition is turned off is relatively high and can be higher than a predetermined minimum limit value provided by the automobile industry, which is not desirable. On the other hand, all modules must be able to activate each other in spite of the turned off automobile ignition.

It has already been proposed to install an electrical cable in parallel with the bus system for automobile modules which are interconnected by an optical bus system. The individual modules are completely switched off when the automobile ignition is turned off. A wake-up signal is transmitted through the electrical cable to reactivate these modules.

However the additional electrical cable between the modules creates higher cable and installation costs and increases the total weight of the concerned installation. On the other hand a galvanic connection exists between the modules, which is unfavorable from the electromagnetic compatibility's point of view and partially cancels the advantages of the optical bus system, particularly in regard to the galvanic uncoupling.

For that reason and to eliminate these problems, DE-A-19708979 proposes an electronic device control which works without a galvanic connection between the modules, and where the optical bus system is exclusively used to establish the wake mode between the modules. It indicates:

that in the power saving mode of each module the same scanning period is used for all the modules and a smaller scanning time interval is switched to receiving;

that one of these modules provides an interrupt signal to the optical bus system, whose duration is equal to or longer than the scanning period; and that at least one other of these modules is switched to permanent reception when it receives the interrupt signal during the next scanning time interval.

Even if the known method or the known device can work without an electrical connection to produce the wake mode, it is necessary to provide a control arrangement which switches the module to active during the scanning interval so that the optical interrupt signals can be transmitted or detected. The known arrangement furthermore does not create a full power saving mode, because the respective optical transmitters or receivers must be switched to active during the scanning interval.

SUMMARY OF THE INVENTION

It is therefore the invention's objective to provide a power saving mode for modules that are connected by an optical bus system, where the periodic inquiries of the different modules and the involved disadvantages do not occur, and which is only turned off so that an actual data exchange can take place between the modules.

This object is achieved by a method of establishing and/or maintaining a wake mode for an electrical installation, which in addition to at least one receiving device has at least one transmitting device that is connected through an optical bus system, characterized by the following steps: that in the first step the respective transmitting device provides optical signals to the optical bus system to establish and/or maintain the wake mode in the respective receiving device, that in a second step the optical signals arriving in the receiving device strike a converter equipped with a photo-sensitive layer, and that in a third step the optical signals striking the layer are used to supply energy to the receiving device.

The invention particularly points out that during the sleep mode no power is consumed by the transmitting and receiving devices of the components which are only connected by the optical bus system. This ensures possibilities of lengthy operation in the case of battery-supported arrangements, and saves power in network-supported arrangements.

BRIEF DESCRIPTION OF THE DRAWINGS

Where.

BEST MODE TO CARRY OUT THE INVENTION

Figure 1:
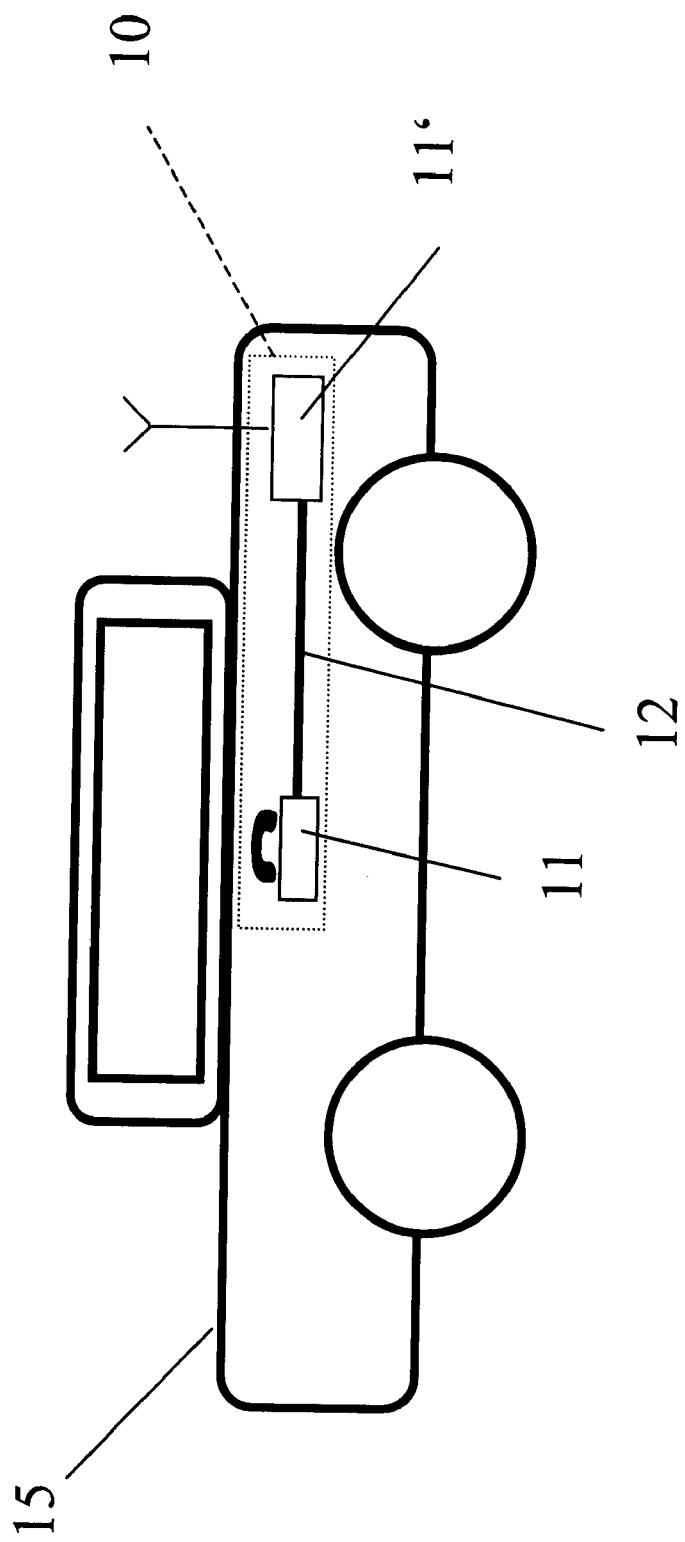
FIG. 1 is a built-in example of the invention.

The invention will now be explained in greater detail by means of the figures. FIG. 1 illustrates an electrical device 10, which in this case is formed of two components 11, 11' interconnected by an optical bus system 12. Each of these two components 11, 11' is designed as a transmitting as well as a receiving device 30, 31 or 30', 31' (not illustrated in FIG. 1). This means that the component 11 can operate as a transmission device 30 for the receiving device 31' of component 11', and that component 11' can operate as a transmission device 30' for the receiving device 31 of component 11. However this configuration of the components 11, 11' is not mandatory. For example, if it is sufficient for an application that only component 11 activates component 11', the equipment of the component 11 can be limited to the transmission device 30 alone, and that of component 11' to the receiving device 31' alone.

In the present case the electrical device 10 is a telephone set of an automobile 15, where the component 11', which is used to establish a connection with a remote station (not shown), is located in the rear of the automobile 15 and the component 11, which is essentially used to operate the telephone set, is located inside the vehicle. For reasons of completeness it should be pointed out that the application of the invention is not limited to telephone sets in automobiles 15, but that it can be used in all instances where at least one of two components 11, 11' which are connected by an optical bus system 12 is set into a wake mode by the other component.

To limit the sleep mode in which the respective component consumes very little or no current at all, a wake mode in the sense of this invention is one where the function of the respective component is fully established by supplying power.

If the electrical arrangement 10 operates in an automobile 15 as shown in FIG. 1, a continuous wake mode of the two components 11, 11' is no problem while the automobile 15 is running. However this changes when the automobile 15 is shut down, because a continuous or even partial establishment of the wake mode can very quickly drain the battery of the automobile 15. The related disadvantages are eliminated if the two components 11, 11' are designed in accordance with FIG. 2.

Each of the two components 11, 11' is equipped with a data processing device 16, 16', a transmitting module 13, 13', a receiving module 14, 14', an optical transmitter 17, 17' and an optical receiver 18, 18'.

It should be pointed out for reasons of completeness that in the sense of this application a combination of the transmitting module 13, 13' and a respective optical transmitter 17, 17' is always called a transmitting device 30, 30', and a combination of the receiving module 14, 14' and a respective optical receiver 18, 18' is always called a receiving device 31, 31'.

The optical transmitter 17' of component 11' is connected to the optical receiver 18 of component 11 by a fiber 19 of the optical bus system 12. The optical transmitter 17 of component 11 is also connected to the optical receiver 18' of component 11' by a fiber 19' of the optical bus system 12.

The data processing device 16 of component 11 is equipped with a keyboard 20, a microphone 21 and a loudspeaker 22. The data processing device 16' contains the GSM unit 23, which in turn is connected to an antenna 24. The data processing device 16' furthermore has a data input 25 that is used to enter information about the condition of the ignition (ON/OFF) of the automobile 15. Both components 11, 11' are additionally connected to a battery (not shown) by the supply lines 26, 26'.

If the ignition is turned on, or the data processing device 16' is informed of this condition through the data input 25, the respective transmitting and receiving devices 30, 30', 31, 31' are connected to the on-board power of the automobile 15 through the supply line 26, 26' and the lines 27, 27'. This means that unrestricted data traffic is possible between the components 11, 11' via the optical bus system 12. To reduce the power consumption by the transmitting and receiving devices 30, 30', 31, 31', the components 11, 11' can be modified so that the lines 27, 27' are only provided with on-board power when an input signal is detected by the GSM unit 23, or the keyboard 20 of component 11 has been activated. If this is wanted, the method for turning off the sleep mode while the ignition is turned off can undergo a corresponding modification, which is described in greater detail in the following, so that the sleep mode can also be eliminated while the ignition is turned on.

If the ignition is turned off or the data input 25 receives a corresponding information, the passage of the on-board power through the data processing device 16' is blocked so that the lines 27' contain no current. To also bring about the sleep mode in component 11 when the ignition is turned off, the component 11 can also be provided with a data input shown in connection with component 11' (not illustrated). But since the activity of component 11 must only be established if an actual data exchange is to take place via the optical bus system 12, a separate data input was omitted in this case and instead the sleep mode of component 11 is organized so that the component 11 is always in the sleep mode when no data exchange takes place via the optical bus system 12. The sleep mode ends when the component 11 is used, by activating the keyboard 20 for instance, or the component 11 is activated by component 11' in accordance with the following explanations.

For example if the GSM unit 23, which is always connected to the on-board power to ensure its ability to function at any time, receives an input signal in the form of an incoming call for instance, next the ability of the transmitting and receiving device 30', 31' to function is established through the line 27' and the optical transmitter 17' sends an optical signal to the fiber 19' of the optical bus system 12 and to the component 11.

Figure 3:
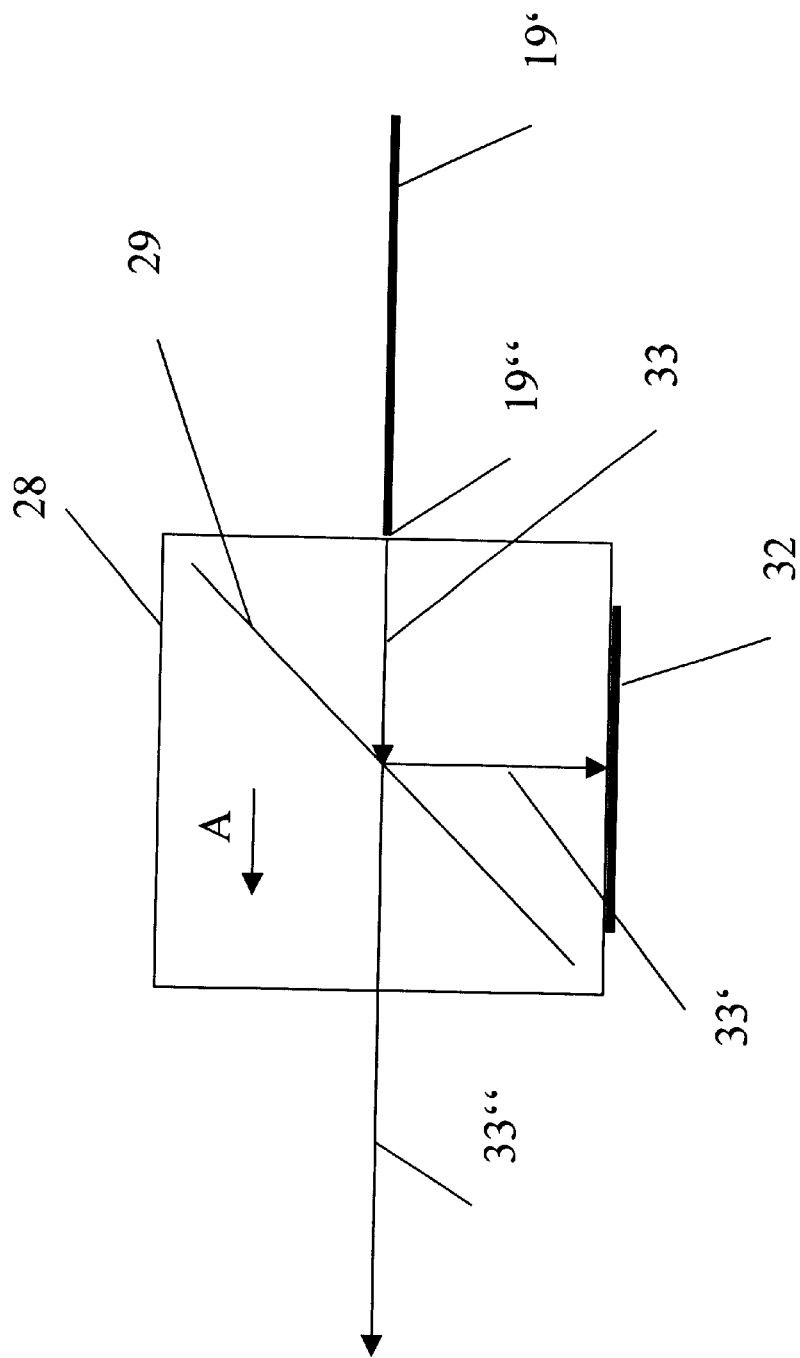
FIG. 3 is a converter.

When this optical signal arrives in component 11, its transmitting and receiving device 30, 31 is still in the sleep mode. For that reason a converter 28 is located before the optical receiver 18 to receive the optical signal emitted by the optical transmitter 17', which is explained in greater detail in conjunction with FIG. 3.

This converter 28 is essentially composed of a semi-transparent mirror 29 and a photo-sensitive layer 32, and the photo-sensitive layer 32 forms a right angle with the outlet 19 of the fiber 19, and the semi-transparent mirror 29 forms a 45-degree angle with the propagation direction A of the light waves 33. If the light waves 33 which are conducted through the fiber 19 strike the semi-transparent mirror 29 in the converter 28, the mirror diverts a portion of the light waves 33 to the photo-sensitive layer 32 while the remaining portion of the light waves 33 passes through the semi-transparent mirror 29 and reaches the optical receiver 18 (not shown in FIG. 3).

Figure 2:
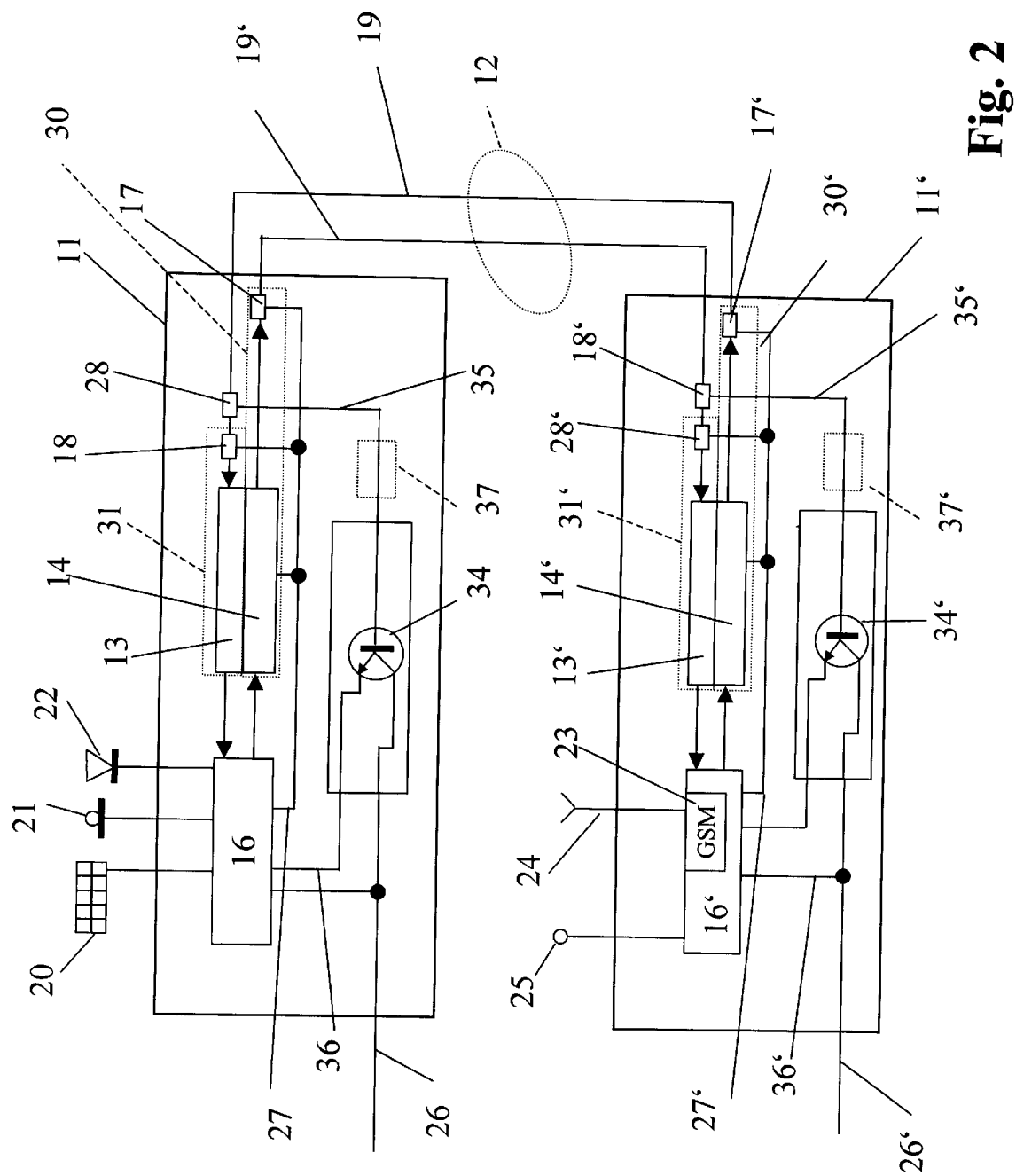
FIG. 2 is a transmitting and receiving module.

If the photo-sensitive layer 32 in the embodiment described in FIG. 2 is a solar cell, the light waves 33' striking it in the converter 28 produce a current which can be used to establish the operating mode in the transmitting and receiving device 30, 31 of component 11. To that end the embodiment described in FIG. 2 is equipped with an electronic switch in the form of a transistor 34. The base of this transistor 34 is connected to the photo-sensitive layer 32 (the solar cell in the embodiment described in FIG. 2) by the line 35. In addition the collector of transistor 34 is connected to the on-board power and the emitter of transistor 34 is connected to the data processing device 16. If the light waves 33' emitted by the optical transmitter 17' strike the solar cell as described in FIG. 3, the transistor 34 switches the on-board power into the line 36 which creates a switching pulse in the data processing device 16. This switching pulse furthermore causes the transmitting and receiving device 30, 31 to be charged with the on-board power through line 27, allowing the two components 11, 11' can exchange data via the optical bus system 12.

If the transmitting and receiving devices 30, 30', 31, 31' of both components 11, 11' are in the sleep mode and for example the keyboard 20 of component 11 is used, the wake mode of the component 11' is established in a similar manner because in the component 11' a converter 28' that corresponds to the converter 28 also precedes the optical receiver 18'. If the optical transmitter 17' emits optical signals, and if the solar cell in converter 28' converts these into an electrical current, this operating mode also switches on the transistor 34', which finally leads to the establishment of the operating mode in the transmitting and receiving device 30', 31' of component 11'.

In addition an expertly designed storage battery 37 can be included in the line 35, 35', which only switches on the transistors 34, 34' when a specified capacitance has been exceeded.

If the sleep mode must be restored after completion of the data exchange via the optical bus system 12, this can easily be achieved with a timing circuit (not illustrated). It is also possible to use the existing converters 28, 28' for that purpose. For example if no data exchange is detected in the optical bus system 12 during a predetermined period of time, one of the data processing devices 16, 16' emits an optical signal which is then translated by the converter 28, 28' that precedes the other data processing device 16, 16', and leads to a switch-off pulse in the other data processing device 16, 16'.

Figure 4:
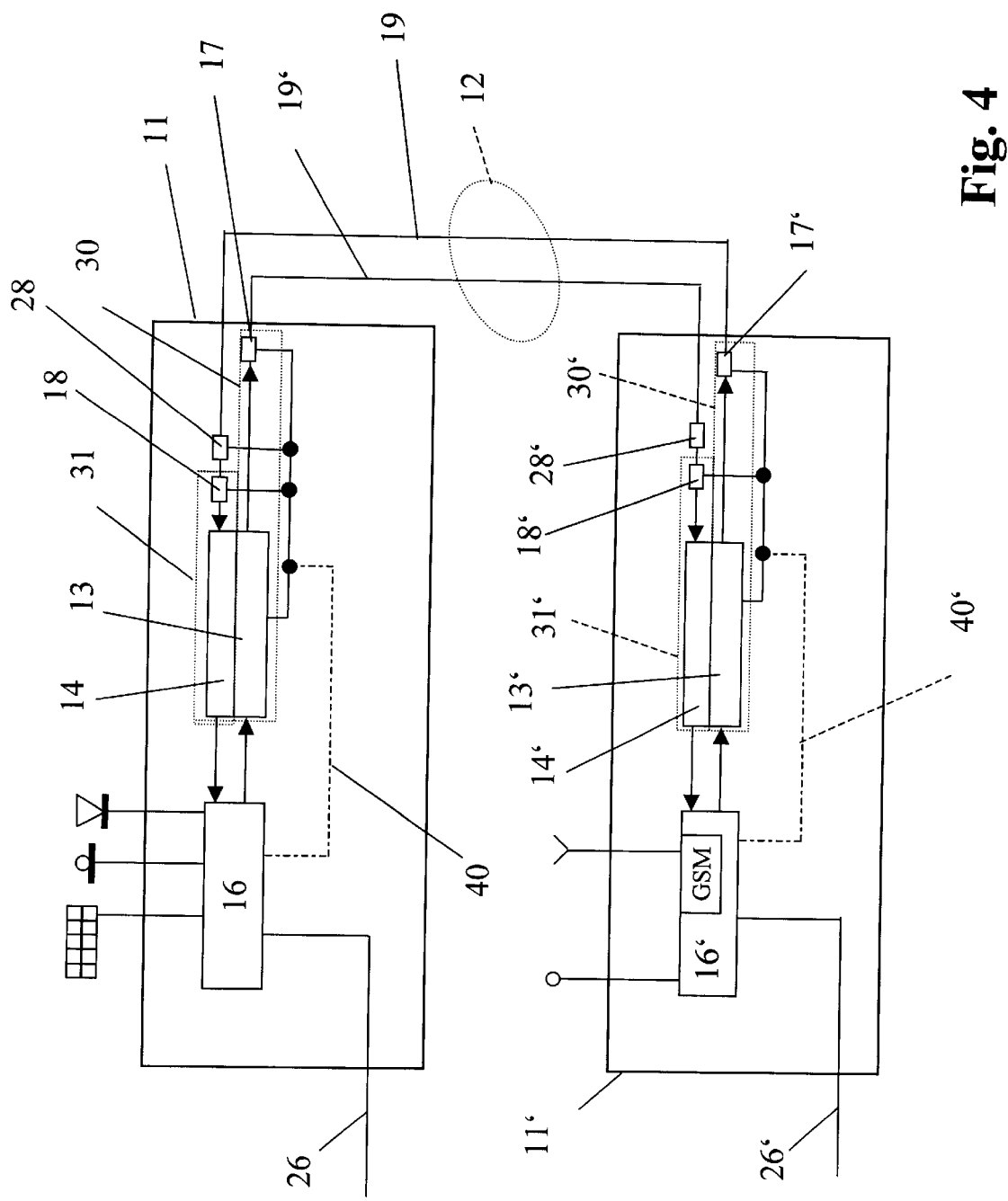
FIG. 4 is another arrangement of FIG. 2.
Figure 5:
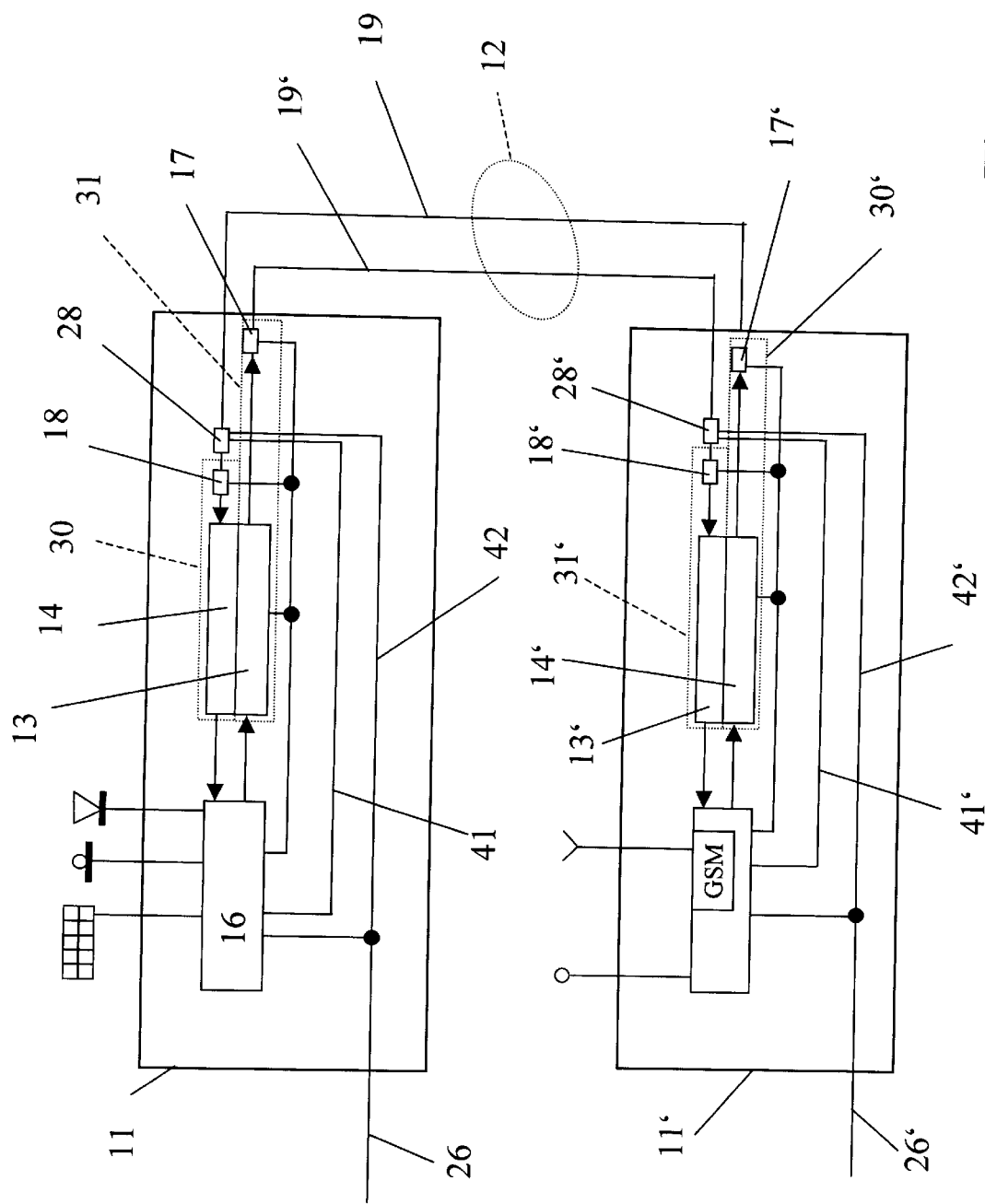
FIG. 5 is another arrangement of FIG. 2.

In the embodiment illustrated in FIG. 4, which like the one in FIG. 5 is also nearly identical to the embodiment in FIG. 2, the transistors 34, 34' and their connecting lines 35, 36, 35', 36' to the data processing devices 16, 16' and the converters 28, 28' have been omitted. The solar cells of the converters 28, 28' are furthermore directly connected to the transmitting and receiving devices 30, 31, 30', 31' of the respective component 11, 11'. If the respective solar cell in this embodiment receives optical signals, the electric energy it converts is used to directly supply the transmitting and receiving devices 30, 31, 30', 31'. Only during the starting phase, namely when both transmitting and receiving devices are in the sleep mode, does the establishment of the operating mode require a brief supply of current to be sent to the respective transmitting and receiving device 30, 31, 30', 31' through line 40, 40'. If no data traffic takes place in the optical bus system 12, the converters 28, 28' can no longer produce any power and the transmitting and receiving devices 30, 31, 30', 31' return to the sleep mode.

In contrast to the embodiments described so far, in the embodiment described in FIG. 5 each of the photo-sensitive layers 32 in the converters 28, 28' is formed by a photo-sensitive resistor. If the light waves 33 emitted by one of the transmitting devices 30, 30' strike the respective converter 28, 28' as well as the photo-sensitive resistor as described in FIG. 3, the current flowing through lines 41, 42, 41', 42' to the respective data processing device 16, 16' is interrupted. This triggers a switching pulse in the respective data processing device 16, 16', which then supplies the on-board power through line 27, 27' to the signalling and receiving device 30, 31; 30', 31' located downstream of the concerned data processing device 16, 16', to eliminate the sleep mode.

Nor is the operating mode described in connection with FIG. 5 limited to the use of photo-sensitive resistors as the photo-sensitive layer 32 in the converters 28, 28'. Rather in another not illustrated embodiment, the photo-sensitive layers 32 of the converters 28, 28' can also be photo-sensitive diodes without changing anything in the circuit shown in FIG. 5.

Figure 6:
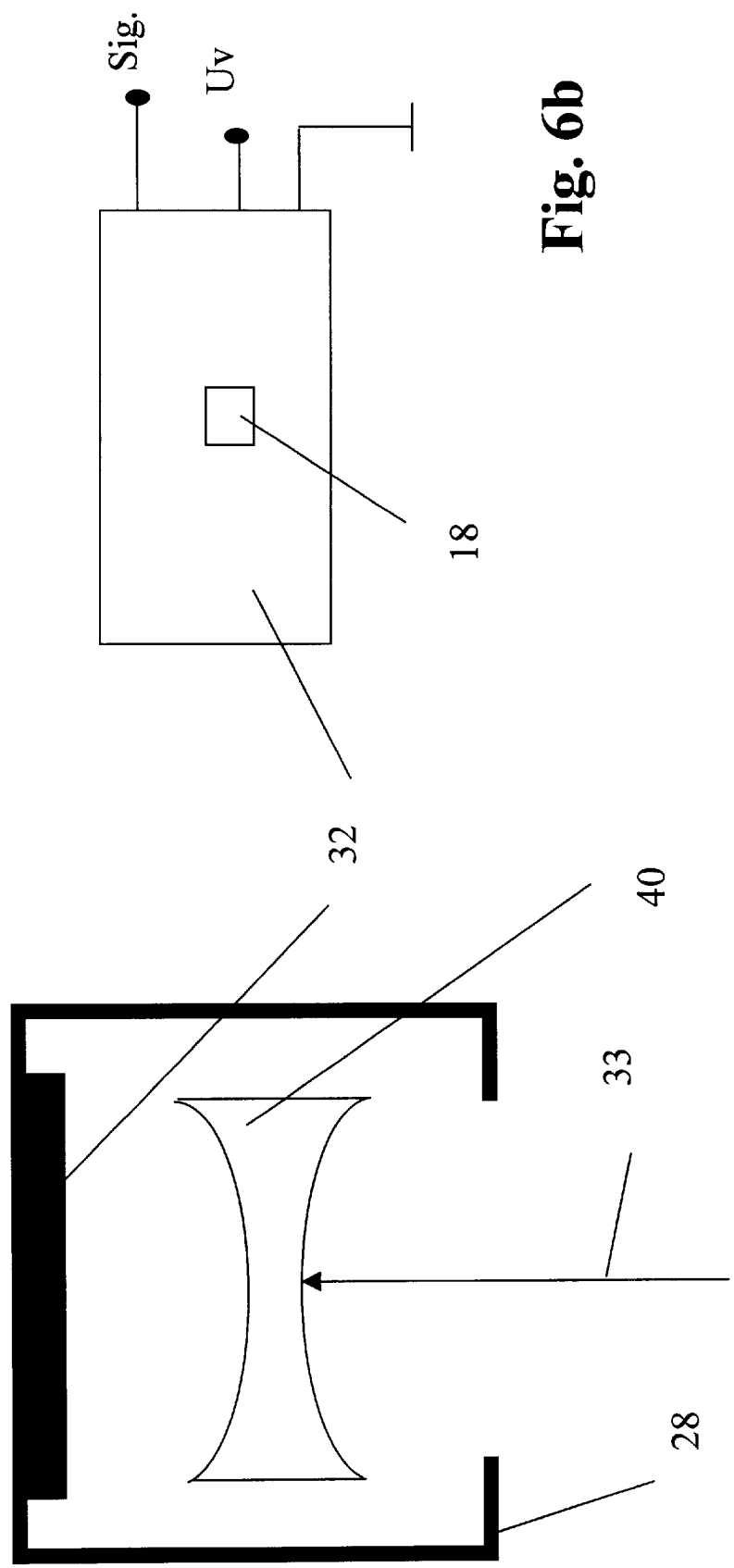
FIGS. 6a/6b are another converter.

FIGS. 6a and 6b show another converter 28. This converter 28 also has a photo-sensitive layer 32 in the form of a solar cell. Furthermore a lens 40 precedes the photo-sensitive layer 32 in the form of a solar cell. If light waves 33 which are supplied by an optical fiber (not shown) strike the photo-sensitive layer 32, a voltage which can be used to supply power can be obtained from the output UV (FIG. 6b).

FIG. 6b is a top view of the photo-sensitive layer 32 in FIG. 6a. This illustration shows that an optical receiver 18 in the form of a photodiode is arranged in the photo-sensitive layer 32. Since the light waves 33, which have passed through the lens 40 in the above-described manner, also strike the optical receiver 18 in the form of the photodiode, an electrical signal (Sig.) which also corresponds to the optical signal is produced at the same time and can be obtained from the output.

Figure 7:
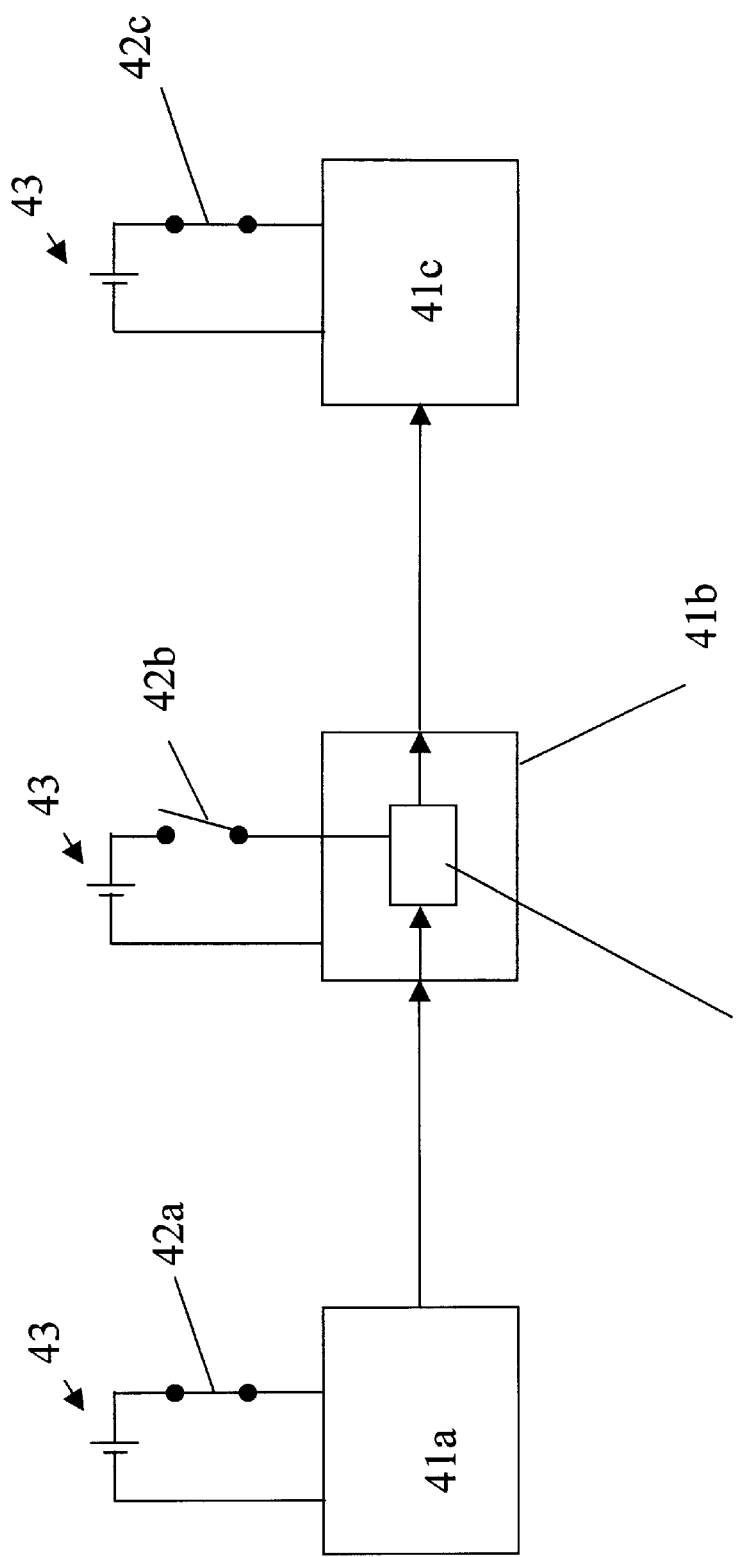
FIG. 7 is another built-in example of the invention.

To prove that the invention is not only limited to telephone applications, FIG. 7 shows an embodiment that contains the components 41a to 41c of a high fidelity set which are interconnected by an optical bus system 12. Each of these components 41a to 41c can be connected by a switch 42a to 42c to a power source 43. As can be seen in the illustration of FIG. 7, only the two switches 42a, 42c are closed. The result is that the optical signal emitted by component 41a to component 41c cannot continue. The problem of lack of conduction can certainly be eliminated by closing the switch 42b as well. However if the component 41b is not otherwise needed except to conduct the optical signals sent by component 41a to component 41c, establishing the power supply for this purpose alone would be a disadvantage because of the associated unnecessary power consumption. To prevent this, component 41b is provided with a converter 28 of the above-described type which branches off power from the optical signal in the above-described manner when the switch 42b is open, and uses it to ensure the conduction of the optical signals through component 41b.

Figure 8:
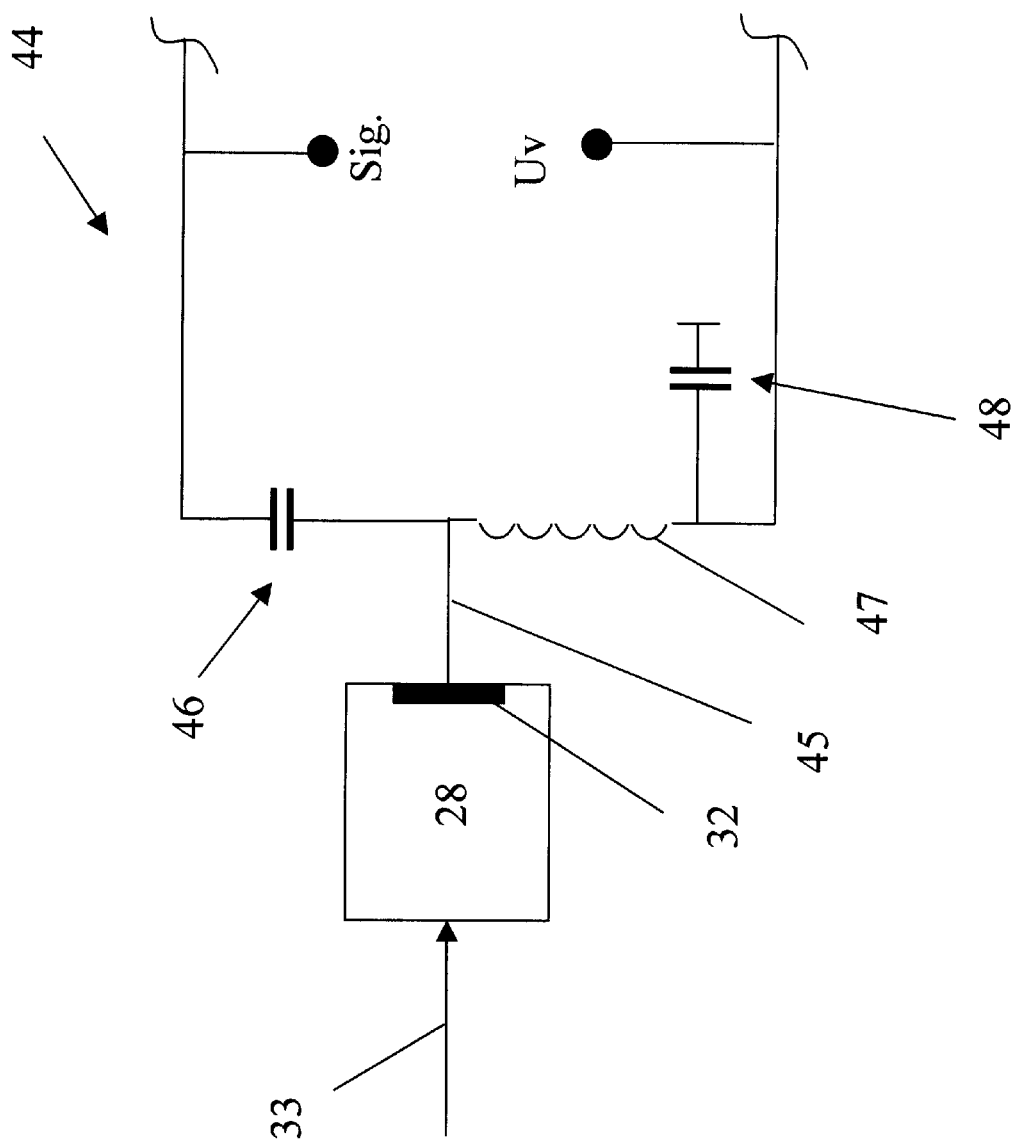
FIG. 8 is a circuit.

FIG. 8 shows a circuit 44 which connects to a converter 28. This converter 28 only has one photo-sensitive layer 32 in the form of a solar cell, which is struck by the light waves 33 and produces a voltage. The voltage produced by the light waves 33 is conducted by line 45 to the circuit 44 where it is branched. A condenser 46 is integrated into one branch of the circuit 44. The purpose of this condenser is to filter out the alternating part of the power conducted by line 45, so that an electrical signal which corresponds to the optical signal can be obtained from output Sig.

The other branch of circuit 44 comprises a coil 47 and a condenser 48 which filters out the direct current part of the power conducted by the line 45. The result is that power is obtained from the output UV and is used to operate the receiving device (not shown in FIG. 8).

What is claimed is:

1. A method of establishing and/or maintaining a wake mode for an electrical installation, which in addition to at least one receiving device has at least one transmitting device that is connected through an optical bus system, comprising the following steps:

providing optical signals to the optical bus system by the transmitting device to establish and/or maintain the wake mode in the receiving device, receiving the optical signals arriving in the receiving device by a converter equipped with a photo-sensitive layer, transforming the optical signals received by the converter into electric energy and using the thus obtained electric energy to supply power to the receiving device; and using the thus obtained electric energy to activate a switch that connects a power source to the receiving device when it is in the closed position.

2. A method as claimed in claim 1, wherein the energy transformed by the converter is accumulated in the receiving device before it is used to supply power to the receiving device.

3. A method as claimed in claim 2, characterized in that the receiving device operates exclusively with the obtained electric energy.

4. A method as claimed in claim 2, characterized in that the photo-sensitive layer is a solar cell.

5. A method as claimed in claim 2, characterized in that in addition to the photo-sensitive layer, the converter has a semi-transparent mirror which divides the incoming optical signal into an energy part and a signal part.

6. A method as claimed in claim 1, characterized in that the photo-sensitive layer is composed of a photo-sensitive diode or a photo-sensitive resistor.

7. A method as claimed in claim 1, characterized in that the photo-sensitive layer is a solar cell.

8. A method as claimed in claim 7, characterized in that in addition to the photo-sensitive layer, the converter has a semi-transparent mirror which divides the incoming optical signal into an energy part and a signal part.

9. A method as claimed in claim 8, characterized in that the photo-sensitive layer is a solar cell.

10. A method as claimed in claim 7, characterized in that the electrical energy from the solar cell has a direct voltage part and an alternating voltage part and that the direct voltage part and the alternating voltage part are filtered out of the electrical energy which is available at the solar cell output after the optical signals are received by the solar cell.

11. A method as claimed in claim 1, characterized in that the receiving device operates exclusively with the obtained electric energy.

12. A method as claimed in claim 1, characterized in that in addition to the photo-sensitive layer, the converter has a semi-transparent mirror which divides the incoming optical signal into an energy part and a signal part.

* * * * *